Oct. 14, 1924.  1,511,860
J. K. WINER
NEEDLE FOR PHONOGRAPHS AND SIMILAR MACHINES
Filed Sept. 24, 1920
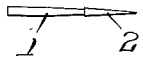
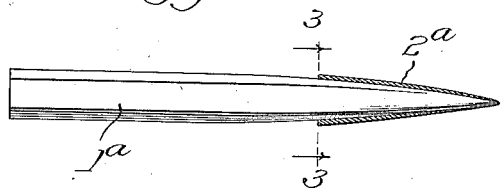
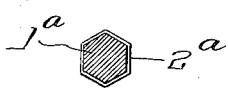 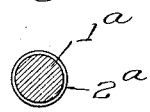
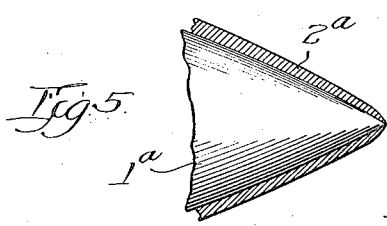
Inventor:
John King Winer.

Patented Oct. 14, 1924.

1,511,860

UNITED STATES PATENT OFFICE.

JOHN KING WINER, OF CHICAGO, ILLINOIS.

NEEDLE FOR PHONOGRAPHS AND SIMILAR MACHINES.

Application filed September 24, 1920. Serial No. 412,446.

*To all whom it may concern:*

Be it known that I, JOHN KING WINER, a citizen of the United States, residing at Chicago, in the county of Cook and State of Illinois, have invented a certain new and useful Improvement in Needles for Phonographs and Similar Machines. of which the following is a full, clear, concise, and exact description, reference being had to the accompanying drawings, forming a part of this specification.

My invention relates to needles for phonographs and similar machines.

The object of the invention is to secure a better tonal effect in devices of the class specified; to prolong the life of the records which are played in the instrument; and to secure other desirable results in a simple and expeditious manner.

In carrying out the invention, I provide a needle with a point of relatively soft material, such for example, as rubber or a rubber composition of some sort. This results in a separate tone effect, eliminating scratching and other objectionable sounds in the sound box, and also reduces the wear and tear on the record very materially, in fact almost eliminating it, thereby prolonging the life of the record.

In the accompanying drawing, Fig. 1 is a view of a needle for phonographs and like instruments embodying my invention;

Fig. 2 is a view on an enlarged scale of a modified form of the same;

Fig. 3 is a cross section taken on line 3—3 in Fig. 2;

Fig. 4 is a cross section of a device on the scale of Fig. 2, but with the device somewhat modified;

Fig. 5 is a view still further enlarged of an end portion of the device.

Referring to the drawings, I show in Fig. 1 a needle for phonograph machines or like instruments consisting of a body part 1 and a point part 2. The body part 1 may be made of any suitable material such as wood or fibre and the point part 2 is preferably made of rubber or rubber composition. As a simple arrangement a needle made of wood or fibre such as now commonly employed may be dipped in liquid rubber so that the point part 2 will be composed of a point part of a wooden or fibre needle with a thin rubber coating on the outside thereof. The needle shown in Fig. 1 has the body part 1 made circular in cross section, as shown in Fig. 4. Instead of having a circular cross section, however, the body part may be made hexagonal in cross section, as shown in Figs. 2 and 3, or be otherwise shaped as desired. In the device shown in Figs. 2 and 3 the body $1^a$ is also preferably dipped and coated with rubber or a rubber composition, so as to form a point portion $2^a$ of rubber or similar material.

In Fig. 5 I show the tip or end of the point showing the manner in which the rubber coating or covering may be applied.

A needle of this sort will have the advantageous results previously mentioned, the scratching and other undesirable noises will be eliminated from the tone and at the same time the records will have practically no wear and tear on them, thereby greatly prolonging their lives.

It will be understood that changes and modifications may be made without departing from the spirit of the invention.

What I claim is:

1. A needle for phonographs and like instruments having a body part of rigid material with its point portion coated with a composition of relatively flexible soft non-abrasive elastic material.

2. A needle for phonographs and like instruments comprising a body part having its point portion coated with elastic material.

In witness whereof, I hereunto subscribe my name this 20th day of September, A. D. 1920.

JOHN KING WINER.